(12) United States Patent
Wang et al.

(10) Patent No.: US 10,373,359 B2
(45) Date of Patent: Aug. 6, 2019

(54) METHOD AND DEVICE FOR ERASING A WRITING PATH ON AN INFRARED ELECTRONIC WHITE BOARD, AND A SYSTEM FOR WRITING ON AN INFRARED ELECTRONIC WHITE BOARD

(71) Applicant: HISENSE ELECTRIC CO., LTD., Qingdao (CN)

(72) Inventors: Min Wang, Qingdao (CN); Chunhua Li, Qingdao (CN); Zhenbao Zhang, Qingdao (CN)

(73) Assignees: Hisense Electric Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 92 days.

(21) Appl. No.: 15/393,677

(22) Filed: Dec. 29, 2016

(65) Prior Publication Data

US 2017/0109917 A1    Apr. 20, 2017

(30) Foreign Application Priority Data

Aug. 3, 2016   (CN) .......................... 2016 1 0628823

(51) Int. Cl.
| | |
|---|---|
| *G06T 11/60* | (2006.01) |
| *B43L 1/00* | (2006.01) |
| *G06F 3/01* | (2006.01) |
| *G06F 3/041* | (2006.01) |
| *G06T 11/20* | (2006.01) |
| *G06F 3/0488* | (2013.01) |

(52) U.S. Cl.
CPC ................ *G06T 11/60* (2013.01); *B43L 1/00* (2013.01); *G06F 3/017* (2013.01); *G06F 3/041* (2013.01); *G06F 3/0488* (2013.01); *G06T 11/203* (2013.01)

(58) Field of Classification Search
CPC ...... G06F 3/0421–3/0423; G06T 11/60; G06T 11/203
See application file for complete search history.

(56) References Cited

U.S. PATENT DOCUMENTS

| | | | |
|---|---|---|---|
| 7,427,984 B2* | 9/2008 | Smirnov | G06F 3/0488 178/18.01 |
| 9,875,021 B2* | 1/2018 | Petkov | G06F 3/04883 |
| 9,904,465 B2* | 2/2018 | Angelov | G06F 3/04883 |
| 9,904,466 B2* | 2/2018 | Angelov | G06F 3/04883 |
| 2009/0135162 A1* | 5/2009 | Van De Wijdeven | G06F 3/0421 345/175 |
| 2018/0004407 A1* | 1/2018 | Angelov | G06F 3/04883 |
| 2018/0052534 A1* | 2/2018 | Ron | G06T 11/60 |
| 2018/0101299 A1* | 4/2018 | Petkov | G06K 9/222 |

* cited by examiner

*Primary Examiner* — Michael Pervan
(74) *Attorney, Agent, or Firm* — Harness, Dickey & Pierce, P.L.C.

(57) ABSTRACT

The disclosure discloses a method for erasing a writing path on an infrared electronic white board, the method including: adding data points to a writing path to obtain a complete writing path in which the distance between any two adjacent data points is no more than an erasing distance corresponding to a selected erasing mode; determining an erasing area according to an input erasing path and the erasing mode; and erasing those data points on the complete writing path, which lie in the erasing area.

14 Claims, 5 Drawing Sheets

METHOD AND DEVICE FOR ERASING A WRITING PATH ON AN INFRARED ELECTRONIC WHITE BOARD, AND A SYSTEM FOR WRITING ON AN INFRARED ELECTRONIC WHITE BOARD

CROSS-REFERENCE TO RELATED APPLICATION

This application claims the benefit and priority of Chinese Patent Application No. 201610628823.8 filed Aug. 3, 2016. The entire disclosure of the above application is incorporated herein by reference.

FIELD

The present disclosure relates to the field of digital drawing, and particularly to a method and device for erasing a writing path on an infrared electronic white board, and a system for writing on an infrared electronic white board.

BACKGROUND

This section provides background information related to the present disclosure which is not necessarily prior art.

An interactive electronic white board can communicate information with a computer, and if the electronic white board is connected with a computer, and contents on the computer are projected onto a screen of the electronic white board, then a cooperative conferencing or teaching environment with a large screen will be created with the aid of specialized application program. An operation can be performed on the white board using a specific positioning pen instead of a mouse to thereby run any application program, where edition, note-making, storage, or any other operation which can be performed on the computer using a keyboard and a mouse can be performed on a file.

In the related art, an interactive electronic white board is generally categorized into a pressure sensitive electronic white board, an electromagnetic electronic white board, an infrared electronic white board, and an optical electronic white board dependent upon their technical principles, where the pressure sensitive electronic white board has been abandoned along with the technological advancement due to its inaccurate positioning, required pressure in use, inconvenience for the user to access, etc.; and the electromagnetic electronic white board in which the problem of inaccurate positioning in the pressure sensitive electronic white board is improved was ever very popular in the market, but it cannot be touched manually and has to be touched using a specialized pen, thus resulting in a high cost of the device, so that the infrared electronic white board has been increasingly favored in the related art.

The infrared electronic white board operates under such a principle that a finger or another object is positioned using an infrared frame surrounding the white board, where the infrared frame transmits signals and receives response signals along the X and Y axes. If the signals are blocked by the finger, then the touch position of the finger will be sensed to thereby position the finger. There is such an advantage thereof that the pen can be replaced by the finger or any other object for the same effect.

SUMMARY

This section provides a general summary of the disclosure, and is not a comprehensive disclosure of its full scope or all of its features.

Some embodiments of the disclosure provide a method for erasing a writing path of an infrared electronic white board, the method including:
adding data points to a writing path to obtain a complete writing path in which the distance between any two adjacent data points is no more than an erasing distance corresponding to a selected erasing mode;
determining an erasing area according to an input erasing path and the erasing mode; and
erasing those data points on the complete writing path, which lie in the erasing area.

Some embodiments of the disclosure further provide a device for erasing a writing path of an infrared electronic white board, the device including:
a memory configured to store at least one machine readable program code; and
a processor configured to execute the at least one machine readable program code: to add data points to a writing path to obtain a complete writing path in which the distance between any two adjacent data points is no more than an erasing distance corresponding to a selected erasing mode; to determine an erasing area according to an input erasing path and the erasing mode; and to erase those data points on the complete writing path, which lie in the erasing area.

Some embodiments of the disclosure further provide a system for writing on an infrared electronic white board, the system including an infrared electronic white board, and a device for erasing a writing path of an infrared electronic white board, wherein:
the infrared electronic white board is configured to accept a writing operation of a user; and
the device for erasing a writing path on an infrared electronic white board is configured: to add data points to a writing path to obtain a complete writing path in which the distance between any two adjacent data points is no more than an erasing distance corresponding to a selected erasing mode; to determine an erasing area according to an input erasing path and the erasing mode; and to erase those data points on the complete writing path, which lie in the erasing area.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

The infrared electronic white board has some advantages, but there is also a disadvantage of the existing infrared electronic white board in use. A user cannot write precisely thereon in that the writing user has to make his or her respective strokes. This is because a segment of drawn lines or a segment of handwriting is typically represented as a path in a digital platform operating with the infrared white boar, where the path is generated by smoothly connecting a series of data points acquired at the underlying layer. If the user needs to erase his or her handwriting, then a segment of the writing path to be erased will be determined at the backend by intersecting an erasing area with points on the path, and if there is such fast writing that the distance between adjacent data points on the segment of the writing path to be erased is more than a coverage area of an erased path corresponding to an erasing block, then the segment of the path where there is fast writing may not be erased, thus degrading the experience of the user accessing the white board.

Figure 1:
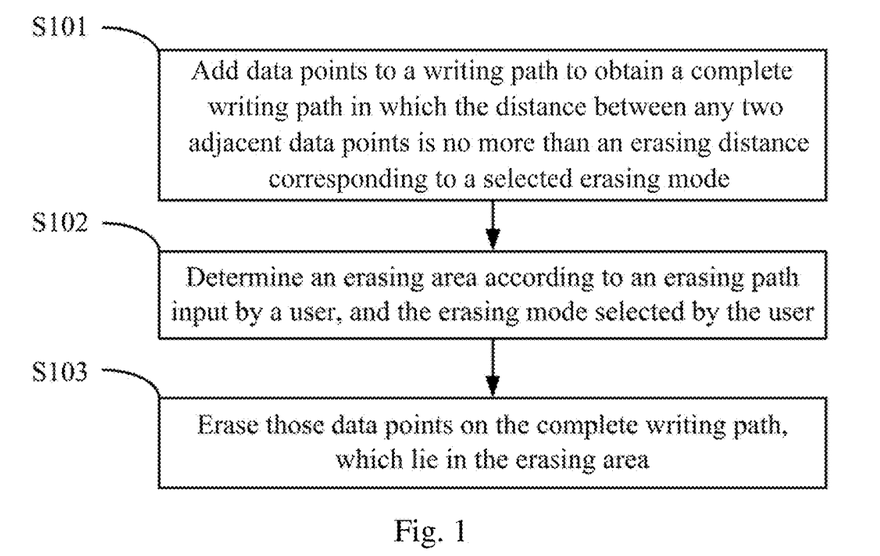
FIG. 1 is a schematic flow chart of a method for erasing a writing path on an infrared electronic white board according to some embodiments of the disclosure.

In view of the problem in the related art, embodiments of the disclosure provide a method for erasing a writing path on an infrared electronic white board, where data points absent between two adjacent points between which there are a large distance on a writing path can be added before the writing path is erased, to thereby address such a problem that such a segment of the writing path that is terminated by the two adjacent points between which there are a large distance may not be erased due to fast writing, inaccurate sensing on the infrared electronic white board, etc., so as to improve in effect the precision of erasing on the infrared electronic white board to the effect of an improved experience of the user. As illustrated in FIG. 1 which is a schematic flow chart of a method for erasing a writing path on an infrared electronic white board according to an embodiment of the disclosure, the method includes the following steps:

The step 101 is to add data points to a writing path to obtain a complete writing path in which the distance between any two adjacent data points is no more than an erasing distance corresponding to a selected erasing mode.

Where an erasing scheme includes at least one of erasing modes including a fixed-block erasing mode, a gesture erasing mode, and a circular erasing mode. Since the erasing distance needs to be determined according to the erasing mode selected by a user, there are different erasing distances corresponding to the different erasing modes, as in the following several instances:

(1) If the erasing mode selected by the user is the fixed-block erasing mode, then the erasing distance will be a half of the shortest side length of a fixed erasing block. For example, if the shape of the erasing block is a square, then the erasing distance will be a half of the side length of the square erasing block; and if the shape of the erasing block is a rectangle, then the erasing distance will be a half of the shorter side length of the rectangular erasing block.

(2) If the erasing mode selected by the user is the gesture erasing mode, then a polygon defining a touch area corresponding to an operation gesture will be determined, and the erasing distance of the gesture erasing mode will be the shortest inner radius of the polygon. In the gesture erasing mode, the operating user makes a corresponding gesture on the infrared electronic white board, and if the touch area corresponding to the operation gesture is above some touch area threshold, then the operation gesture will be determined as an operation gesture for gesture erasing. Thus, the operation gesture for gesture erasing is a touch control operation on which the touch area is larger than a preset threshold, that is the operation gesture for gesture erasing is an operation based on relative bigger touch control area, i.e., a user puts his/her palm on the infrared electronic white board, and the touch control area corresponding to the palm is above a preset area threshold, or the user further slides the palm for a distance, and the touch control area corresponding to the area on which the palm slid is above the preset area threshold.

(3) If the erasing mode selected by the user is the circular erasing mode, then the circular erasing path will be processed into a closed graph, and the erasing distance of the circular erasing mode will be determined as the shortest distance between a data point on the closed graph, and the central point of the closed graph.

It shall be noted that if the selected erasing mode includes at least two of the fixed-block erasing mode, the gesture erasing mode, and the circular erasing mode, then the shorter one of the erasing distances of the selected erasing modes will be determined as the erasing distance corresponding to the selected erasing modes. For example, if the user selects the three erasing modes, then the shortest one of the three erasing distances determined for the three erasing modes will be selected as the erasing distance.

The data points are added to the writing path to obtain the complete writing path by determining the erasing distance corresponding to the selected erasing mode; determining whether the distance between any two adjacent data points on the writing path is more than the erasing distance; and if so, then adding at least one data point between any two adjacent data points so that the distance between any two adjacent data points is no more than the erasing distance; otherwise, determining the writing path as the complete writing path.

Here the data points can be added by determining a first data point on the writing path as a comparison point, determining whether the distance between the comparison point and a data point next to the comparison point is more than the corresponding erasing distance, if so, then adding at least one data point between the comparison point and the adjacent data point, and determining the next data point as a updated comparison point, and determining whether the distance between the updated comparison point and a next data point is more than the corresponding erasing distance until all the points on the writing path are traversed. If all the distances between the respective two adjacent data points on the writing path are more than the erasing distance, then determining the writing path as the complete writing path.

The step 102 is to determine an erasing area according to an erasing path input by a user, and the erasing mode selected by the user.

Since there are three corresponding erasing modes in the erasing scheme, i.e., the fixed-block erasing mode, the gesture erasing mode, and the circular erasing mode, the corresponding erasing area can be determined according to the erasing path input by the user in the following several instances:

If the erasing mode is the fixed-block erasing mode, then a data point on the erasing path will be determined as the center of an erasing block, the erasing block will be determined, and a union set including the erasing blocks corresponding to the respective data points will be determined as the erasing area; or If the erasing mode is the gesture erasing mode, then a data point on the erasing path will be determined as the center of an erasing block, the erasing block will be determined, and a union set including the respective erasing blocks will be determined as the erasing area; or If the erasing mode is the circular erasing mode, then a curve corresponding to the input erasing path will be processed into a closed graph, and an area surrounded by the closed graph will be determined as the erasing area.

Moreover there may be a large distance between data points in the determined erasing area, so data points can be added to the erasing path in the erasing area, by determining the erasing distance corresponding to the selected erasing mode; determining whether the distance between any two adjacent data points on the input erasing path is more than the determined erasing distance corresponding to the erasing mode; and if so, then adding at least one data points between the any two adjacent data points on the input erasing path so that the distance between the any two adjacent data points on the input erasing path is no more than the erasing distance corresponding to the erasing mode.

The step 103 is to erase those data points on the complete writing path, which lie in the erasing area.

An intersection area of the complete writing path with the erasing area is determined; and Those data points on the complete writing path, which lie in the intersection area are determined, and the data points in the intersection area are erased from the complete writing path.

The technical solution according to the embodiments of the disclosure have the following advantageous effects:

The embodiments of the disclosure provide a method for erasing a writing path on an infrared electronic white board, where data points absent between two adjacent points between which there are a large distance on a writing path can be added before the writing path is erased, to thereby address such a problem that such a segment of the writing path that is terminated by the two adjacent points between which there are a large distance may not be erased due to fast writing, inaccurate sensing on the infrared electronic white board, etc., so as to improve in effect the precision of erasing on the infrared electronic white board to the effect of an improved experience of the user.

It shall be noted that the embodiments described here are only a part but not all of the embodiments of the disclosure. Based upon the embodiments here of the disclosure, all the other embodiments which can occur to those ordinarily skilled in the art without any inventive effort shall fall into the scope of the disclosure as claimed.

In order to further illustrate the technical idea of the disclosure, the technical solution according to the embodiments of the disclosure will be described below in details in connection an application scenario thereof.

Figure 2:
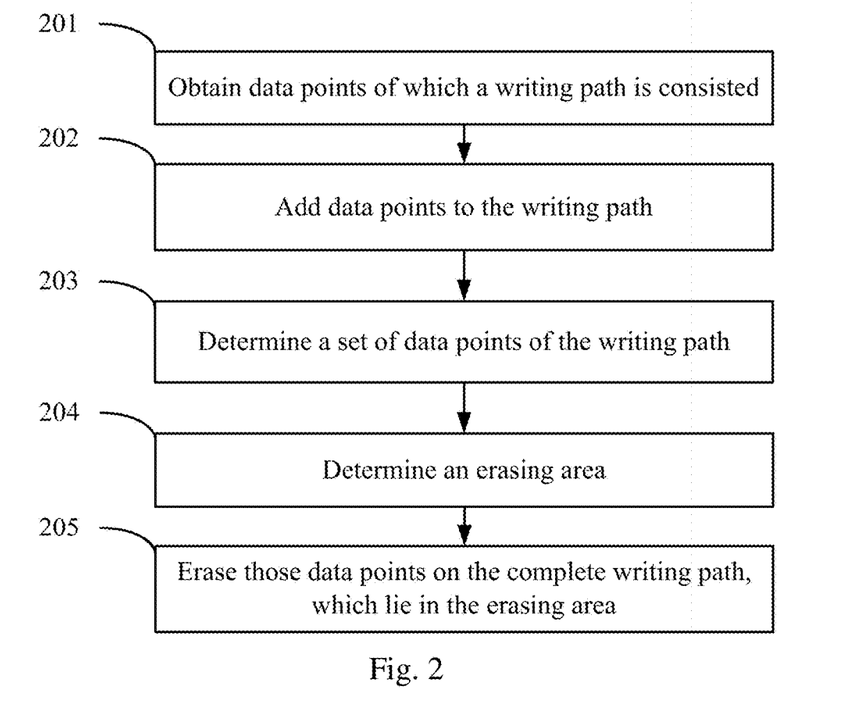
FIG. 2 is a schematic flow chart of a method for erasing on an Android-based infrared electronic white board according to some embodiments of the disclosure.

As illustrated in FIG. 2 which is a schematic flow chart of a method for erasing on an Android based infrared electronic white board according to an embodiment of the disclosure, the method includes the following steps:

The step 201 is to obtain data points of which a writing path is consisted.

The step 202 is to add data points to the writing path.

There is a writing path each time a user drops down and lifts up his or her finger or another object, where the writing path is consisted of a series of data points. It is determined whether the distance between any two adjacent data points on the writing path is more than the erasing distance corresponding to the erasing mode selected by the user:

If the user selects the erasing mode, then the erasing distance corresponding to the selected erasing mode will be determined, and it will be determined whether the distance between any two adjacent data points on the writing path is more than the erasing distance corresponding to the erasing mode selected by the user; and if so, then at least one data point will be added between any two adjacent data points so that the distance between any two adjacent data points is no more than the erasing distance corresponding to the erasing mode selected by the user; otherwise, the writing path will be determined as a complete writing path.

Figure 3A:
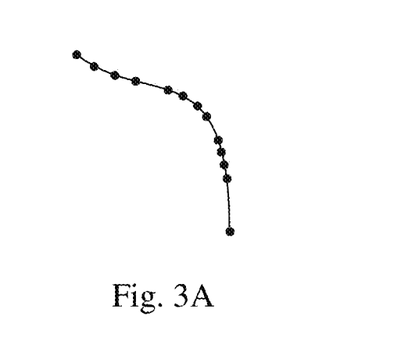
FIG. 3A illustrates a drawn line before points are added thereto in an application scenario.
Figure 3B:
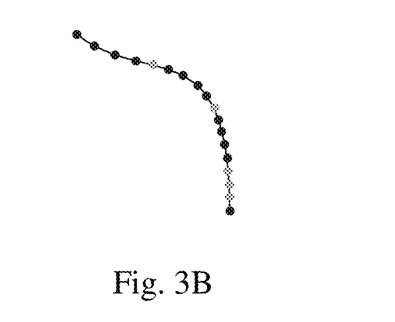
FIG. 3B is a schematic diagram of a method for adding points to a writing path in an application scenario.

FIG. 3A illustrates the writing path before the data points are added thereto, and FIG. 3B illustrates the writing path before the data points are added thereto, where dots in gray on the writing path represents the added data points.

The step 203 is to determine a set of data points of the writing path.

The added data points are connected smoothly into the complete writing path, and a path set is consisted of a set of data points of the complete writing path.

The step 204 is to determine an erasing area.

Figure 4A:
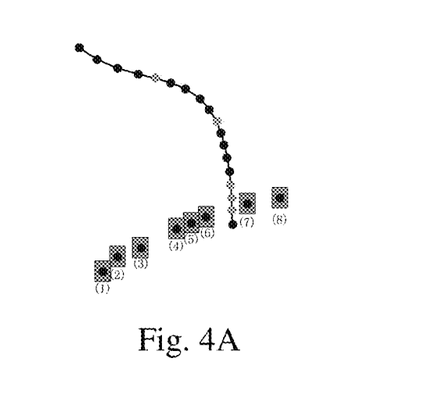
FIG. 4A illustrates an erased path before points are added thereto in block erasing and gesture erasing modes in an application scenario.

By way of an example, the erasing area is determined according to an erasing path input by the user, and the erasing mode selected by the user, and since there are different erasing modes, the erasing area can be determined differently in the following several instances:

1) In the fixed-block erasing mode, then a data point on the erasing path is determined as the center of an erasing block, the erasing block is determined, and a union set including the erasing blocks corresponding to the respective data points is determined as the erasing area; and as illustrated in FIG. 4A, if a path between a data point 1 and a data point 8 is an erasing path, and a data point corresponds to a fixed erasing block according to the length of the fixed erasing block, then a union set including 8 erasing blocks corresponding to the data points 1 to 8 will be an erasing area.

Figure 4B:
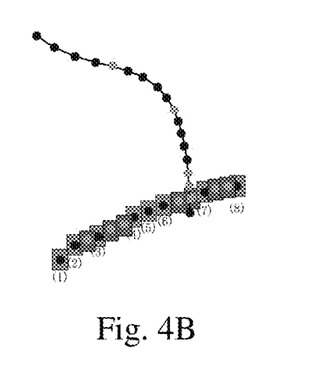
FIG. 4B is a schematic diagram of a method for adding points to an erased path in block erasing and gesture erasing modes in an application scenario.

Moreover there are large distances between the data point (2) and the data point (3), between the data point (3) and the data point (4), between the data point (6) and the data point (7), and between the data point (7) and the data point (4) on the erasing path in FIG. 4A. Data points are added between these inconsecutive data points as illustrated in FIG. 4B, where data dots in gray represent the added data points, so that the erasing path becomes a consecutive path.

2) In the gesture mode, then a data point on the erasing path is determined as the center of an erasing block, the erasing block is determined, and a union set including the respective erasing blocks will be determined as the erasing area;

Alike if there is a large distance between any two adjacent data points on the erasing path, then data points will be added to the erasing path.

Figure 5:
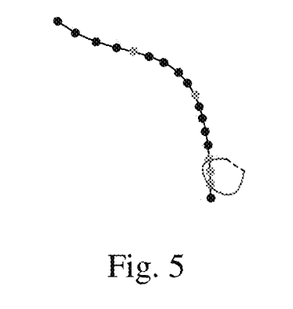
FIG. 5 is a schematic diagram of a method for adding points to an erased path in a circular erasing mode in an application scenario.

3) In the circular erasing mode, a curve corresponding to the input erasing path is processed into a closed graph, and an area surrounded by the closed graph is determined as the erasing area; and as illustrated in FIG. 5, firstly the circular erasing path input by the user is processed into a closed graph, and an area surrounded by the closed graph is determined as the erasing area;

Alike if there is a large distance between any two adjacent data points on the erasing path, then data points will be added to the erasing path.

Figure 6:
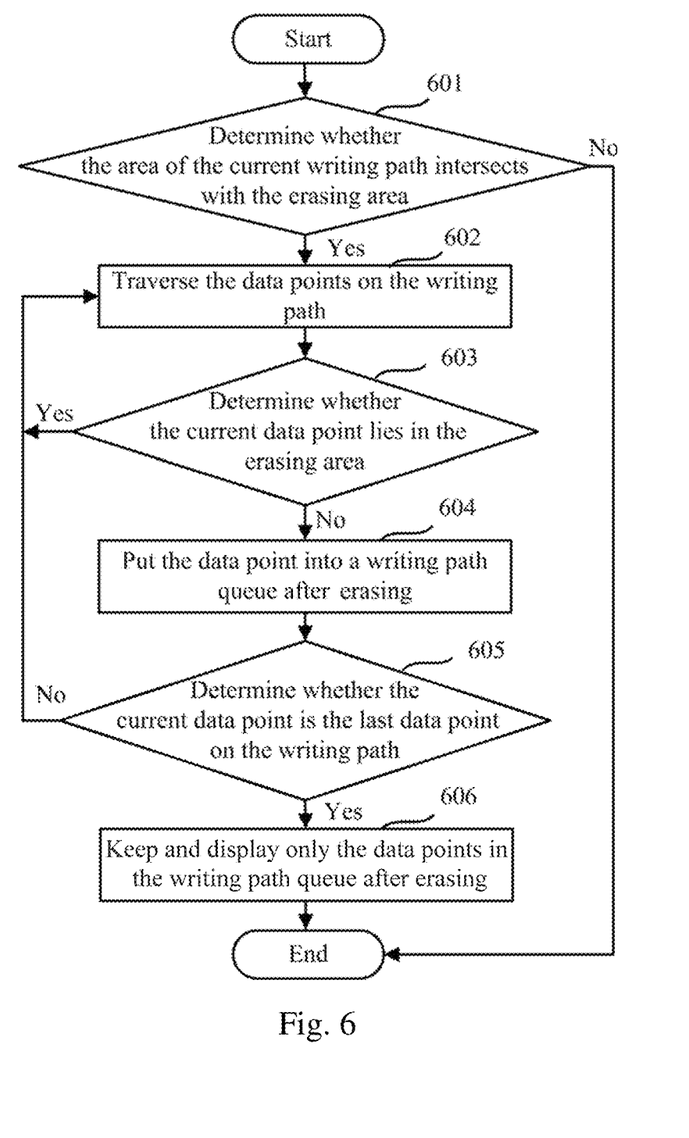
FIG. 6 is a schematic operating flow chart in an erasing algorithm in an application scenario.

The step 205 is to erase those data points on the complete writing path, which lie in the erasing area. The erasing operation can be performed in some erasing algorithm, for example, as illustrated in FIG. 6 including the following steps:

The step 601 is to determine whether the area of the current writing path intersects with the erasing area, and if so, then the flow will proceed to the step 602; otherwise, the flow will end;

The step 602 is to traverse the data points on the writing path;

The step 603 is to determine whether the current data point lies in the erasing area, and if so, then the flow will return to the step 602; otherwise, the flow will proceed to the step 604;

The step 604 is to put the data point into a writing path queue after erasing; and The step 605 is to determine whether the current data point is the last data point on the writing path, and if so, and the flow will proceed to the step 606; otherwise, the flow will return to the step 602;

The step 606 is to keep and display only the data points in the writing path queue after erasing, then the flow will end.

Given the writing path illustrated in FIG. 3A, if there are no data points to be added, then given the erasing path illustrated in FIG. 4A, it will be determined that the data points on the writing path do not lie in the erasing area, so that such a segment of the writing path that correspond to these data points will not be erased, thus resulting in the added data points in gray on the writing path to which the data points are added, as illustrated in FIG. 4B.

The embodiments of the disclosure provide a method for erasing a writing path on an infrared electronic white board with such an advantage that since the writing path is generated while writing on the infrared electronic white board, the information about the data points on the writing path can be obtained, and for those data points between which there is a large distance, the different patterns in which the data points are added to the writing path can be determined for the different erasing modes, so that if the user is erasing a segment of the writing path, then the segment will be avoided in effect from being erased incompletely to the effect of precise erasing so as to improve the experience of the user accessing the infrared electronic white board.

It shall be noted that the embodiments described here are only a part but not all of the embodiments of the disclosure. Based upon the embodiments here of the disclosure, all the other embodiments which can occur to those ordinarily skilled in the art without any inventive effort shall fall into the scope of the disclosure as claimed.

Figure 7:
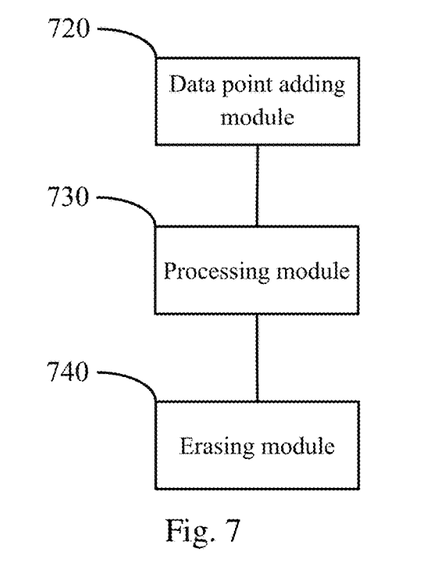
FIG. 7 is a schematic structural diagram of a device for erasing a writing path on an infrared electronic white board according to some embodiments of the disclosure.

In order to describe the solution according to the embodiments of the disclosure more clearly, an embodiment of the disclosure further provides a device for erasing a writing path on an infrared electronic white board based upon the same inventive idea as the method above, and FIG. 7 illustrates a schematic structural diagram of the device for erasing a writing path on an infrared electronic white board, where the device for erasing a writing path on an infrared electronic white board includes the following modules:

A data point adding module 720 is configured to add data points to a writing path to obtain a complete writing path in which the distance between any two adjacent data points is no more than an erasing distance corresponding to a selected erasing mode;

A processing module 730 is configured to determine an erasing area according to an input erasing path and the erasing mode; and An erasing module 740 is configured to erase those data points on the complete writing path, which lie in the erasing area.

In some application scenarios, the data point adding module 720 is configured: to determine the erasing distance corresponding to the selected erasing mode; to determine whether the distance between any two adjacent data points on the writing path is more than the erasing distance; and if so, to add at least one data point between any two adjacent data points so that the distance between any two adjacent data points is no more than the erasing distance; otherwise, to determine the writing path as the complete writing path.

In some application scenarios, the processing module 730 is configured:

If the erasing mode is a fixed-block erasing mode, to determine a data point on the erasing path as the center of an erasing block, to determine the erasing block, and to determine a union set including the erasing blocks corresponding to the respective data points as the erasing area; or If the erasing mode is a gesture erasing mode, to determine a data point on the erasing path as the center of an erasing block, to determine the erasing block, and to determine a union set including the respective erasing blocks as the erasing area; or If the erasing mode is a circular erasing mode, to process a curve corresponding to the input erasing path into a closed graph, and to determine an area surrounded by the closed graph as the erasing area.

The processing module 730 is further configured: to determine the erasing distance corresponding to the selected erasing mode; to determine whether the distance between any two adjacent data points on the input erasing path is more than the determined erasing distance corresponding to the erasing mode; and if so, to add at least one data point between any two adjacent data points on the input erasing path so that the distance between any two adjacent data points on the input erasing path is no more than the erasing distance corresponding to the erasing mode.

In some application scenarios, the erasing module 740 is configured: to determine an intersection area of the complete writing path with the erasing area; and to determine those data points on the complete writing path, which lie in the intersection area, and to erase the data points in the intersection area from the complete writing path.

Figure 8:
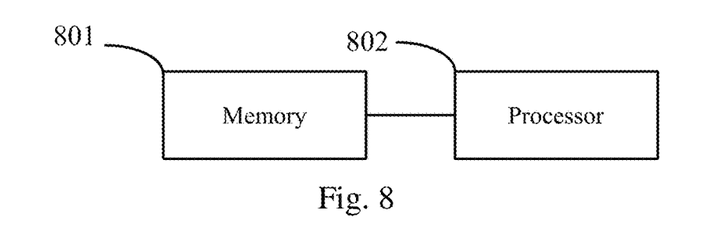
FIG. 8 is a schematic structural diagram of a device for erasing a writing path on an infrared electronic white board according to some embodiments of the disclosure.

An embodiment of the disclosure further provides a device for erasing a writing path on an infrared electronic white board as illustrated in FIG. 8, where the device includes:

A memory 801 is configured to store at least one machine readable program code; and A processor 802 is configured to execute the at least one machine readable program code: to add data points to a writing path to obtain a complete writing path in which the distance between any two adjacent data points is no more than an erasing distance corresponding to a selected erasing mode; to determine an erasing area according to an input erasing path and the erasing mode; and to erase those data points on the complete writing path, which lie in the erasing area.

The processor 802 configured to execute the at least one machine readable program code to add the data points to the writing path to obtain the complete writing path is configured:

To determine the erasing distance corresponding to the selected erasing mode; to determine whether the distance between any two adjacent data points on the writing path is more than the erasing distance; and if so, to add at least one data point between any two adjacent data points so that the distance between any two adjacent data points is no more than the erasing distance; otherwise, to determine the writing path as the complete writing path.

The processor 802 configured to execute the at least one machine readable program code to determine the erasing area according to the input erasing path input and the erasing mode selected by the user is configured: if the erasing mode is a fixed-block erasing mode, to determine a data point on the erasing path as the center of an erasing block, to determine the erasing block, and to determine a union set including the erasing blocks corresponding to the respective data points as the erasing area; or if the erasing mode is a gesture erasing mode, to determine a data point on the erasing path as the center of an erasing block, to determine the erasing block, and to determine a union set including the respective erasing blocks as the erasing area; or if the erasing mode is a circular erasing mode, to process a curve corresponding to the input erasing path into a closed graph, and to determine an area surrounded by the closed graph as the erasing area.

The processor 802 is further configured to execute the at least one machine readable program code: to determine the erasing distance corresponding to the selected erasing mode; to determine whether the distance between any two adjacent data points on the input erasing path is more than the determined erasing distance corresponding to the erasing mode; and if so, to add at least one data point between any two adjacent data points on the input erasing path so that the distance between any two adjacent data points on the input erasing path is no more than the erasing distance corresponding to the erasing mode.

The processor 802 configured to execute the at least one machine readable program code to erase those data points on the complete writing path, which lie in the erasing area is configured: to determine an intersection area of the complete writing path with the erasing area; and to determine those data points on the complete writing path, which lie in the intersection area, and to erase the data points in the intersection area from the complete writing path.

The processor 802 configured to execute the at least one machine readable program code to determine the erasing distance corresponding to the selected erasing mode is configured:

To determine the erasing distance of the fixed-block erasing mode as a half of the shortest side length of a fixed erasing block;

To determine a polygon defining a touch area corresponding to an operation gesture, and to determine the erasing distance of the gesture erasing mode as the shortest inner radius of the polygon; and To process the circular erasing path into a closed graph, and to determine the erasing distance of the circular erasing mode as the shortest distance between a data point on the closed graph, and the central point of the closed graph.

The processor 802 is further configured to execute the at least one machine readable program code: if the selected erasing mode includes at least two of the fixed-block erasing mode, the gesture erasing mode, and the circular erasing mode, to determine the shorter one of the erasing distances of the selected erasing modes as the erasing distance corresponding to the selected erasing modes.

Figure 9:
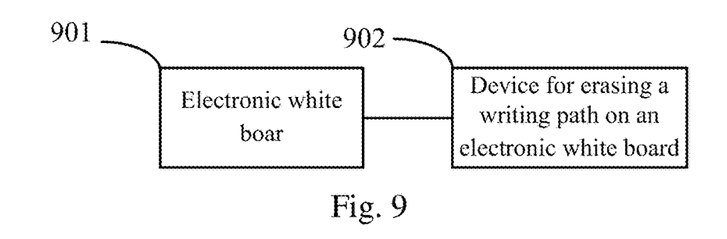
FIG. 9 is a schematic structural diagram of a system for writing on an infrared electronic white board according to some embodiments of the disclosure.

An embodiment of the disclosure further provides a system for writing on an infrared electronic white board as illustrated in FIG. 9, where the system includes an infrared electronic white board 901 and a device 902 for erasing a writing path on an infrared electronic white board, where the infrared electronic white board 901 is configured to accept a writing operation of a user; and the device 902 for erasing a writing path on an infrared electronic white board can be the device as illustrated in FIG. 7 or FIG. 8, and perform the corresponding functions of the device as illustrated in FIG. 7 or FIG. 8.

It shall be noted that the embodiments described here are only a part but not all of the embodiments of the disclosure. Based upon the embodiments here of the disclosure, all the other embodiments which can occur to those ordinarily skilled in the art without any inventive effort shall fall into the scope of the disclosure as claimed.

Those skilled in the art can clearly appreciate from the foregoing description of the embodiments that the embodiments of the disclosure can be implemented in software plus a necessary general hardware platform or, of course, in hardware, although the former implementation is preferred in many cases. Based upon such understanding, the technical solutions of the embodiments of the disclosure in essence or the part thereof contributing to the related art can be embodied in the form of a software product which can be stored in a nonvolatile storage medium (e.g., a CD-ROM, a U-disk, mobile hard disk, etc.), and which includes several instructions to cause a computer device (e.g., a mobile phone, a personal computer, a server, a network device, etc.) to perform the method according to the respective embodiments of the disclosure.

Those skilled in the art can appreciate that the drawings are merely schematic diagrams of the preferred embodiments, and the modules or the flows in the drawings may not be necessary to the embodiments of the disclosure.

Those skilled in the art can appreciate that the modules in the device according to the embodiments of the disclosure can be distributed in the device according to the embodiments of the disclosure or located in one or more apparatuses different from those of the embodiments given corresponding variations. The modules of the foregoing embodiments can be integrated together or deployed separately or can be combined into one module or further subdivided into a plurality of sub-modules.

The embodiments of the disclosure have been numbered only for the sake of a convenient description but will not suggest any superiority of one embodiment to another.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for erasing a writing path on an infrared electronic white board, the method comprising:
   determining an erasing distance corresponding to a selected erasing mode, wherein the selected erasing mode comprises a fixed-block erasing mode or a circular erasing mode;
   for any two adjacent data points on a writing path, determining whether a distance between the two adjacent data points on the writing path is more than the erasing distance, and in response to the distance between the two adjacent data points on the writing path being more than the erasing distance, adding at least one data point between the two adjacent data points on the writing path, so that a distance between any two adjacent data points on the writing path is no more than the erasing distance;
   determining an erasing area according to an input erasing path and the selected erasing mode, wherein determining the erasing area according to the input erasing path and the selected erasing mode comprises:
      in response to the selected erasing mode being the fixed-block erasing mode, determining each of a plurality of data points on the input erasing path as a center of a preset fixed erasing block to determine an erasing block, and determining a union set of erasing blocks corresponding to the data points on the input erasing path as the erasing area; or
      in response to the selected erasing mode being the circular erasing mode, processing a curve corresponding to the input erasing path into a closed path, and determining an area surrounded by the closed path as the erasing area; and
   erasing those data points on the writing path, which lie in the erasing area.

2. The method according to claim 1, wherein before determining the erasing area according to the input erasing path and the selected erasing mode, the method further comprises:
   for any two adjacent data points on the input erasing path, determining whether a distance between the two adjacent data points on the input erasing path is more than the erasing distance corresponding to the selected erasing mode; and
   in response to the distance between the two adjacent data points on the input erasing path being more than the erasing distance corresponding to the selected erasing mode, adding at least one data point between the two adjacent data points on the input erasing path, so that a distance between any two adjacent data points on the input erasing path is no more than the erasing distance corresponding to the selected erasing mode.

3. The method according to claim 1, wherein erasing the data points on the writing path, which lie in the erasing area comprises:
   determining an intersection area of the writing path with the erasing area; and
   determining those data points on the writing path, which lie in the intersection area, and erasing the data points in the intersection area from the writing path.

4. The method according to claim 1, wherein determining the erasing distance corresponding to the selected erasing mode comprises:
   in response to the selected erasing mode being the fixed-block erasing mode, determining the erasing distance of the fixed-block erasing mode as a half of the shortest side length of the preset fixed erasing block; or
   in response to the selected erasing mode being the circular erasing mode, processing a circular erasing path into a closed path, and determining the erasing distance of the circular erasing mode as the shortest distance between a data point on the closed path, and a central point of the closed path.

5. The method according to claim 4, further comprising:
   in response to the selected erasing mode comprising both of the fixed-block erasing mode and the circular erasing mode, determining a shorter one of erasing distances of the fixed-block erasing mode and the circular erasing mode as the erasing distance corresponding to the selected erasing mode.

6. A device for erasing a writing path on an infrared electronic white board, the device comprising:
   a memory configured to store at least one machine readable program code; and
   a processor configured to execute the at least one machine readable program code to:
   determine an erasing distance corresponding to a selected erasing mode, wherein the selected erasing mode comprises a fixed-block erasing mode or a circular erasing mode;
   for any two adjacent data points on a writing path, determine whether a distance between the two adjacent data points on the writing path is more than the erasing distance, and in response to the distance between the two adjacent data points on the writing path being more than the erasing distance, add at least one data point between the two adjacent data points on the writing path, such that a distance between any two adjacent data points on the writing path is no more than the erasing distance;
   determine an erasing area according to an input erasing path and the selected erasing mode, wherein in response to the selected erasing mode being the fixed-block erasing mode, determine each of a plurality of data points on the input erasing path as a center of a preset fixed erasing block to determine an erasing block, and determine a union set of erasing blocks corresponding to the data points on the input erasing path as the erasing area, or wherein in response to the selected erasing mode being the circular erasing mode, process a curve corresponding to the input erasing path into a closed path, and determine an area surrounded by the closed path as the erasing area; and
   erase those data points on the writing path, which lie in the erasing area.

7. The device according to claim 6, wherein the processor is further configured to execute the at least one machine readable program code to:
   for any two adjacent data points on the input erasing path, determine whether a distance between the two adjacent data points on the input erasing path is more than the erasing distance corresponding to the selected erasing mode; and
   in response to the distance between the two adjacent data points on the input erasing path being more than the erasing distance corresponding to the selected erasing mode, add at least one data point between the two adjacent data points on the input erasing path, so that a distance between any two adjacent data points on the input erasing path is no more than the erasing distance corresponding to the selected erasing mode.

8. The device according to claim 6, wherein the processor is configured to execute the at least one machine readable program code to:
determine an intersection area of the writing path with the erasing area; and
determine those data points on the writing path, which lie in the intersection area, and erase the data points in the intersection area from the writing path.

9. The device according to claim 6, wherein the processor is configured to execute the at least one machine readable program code to:
In response to the selected erasing mode being the fixed-block erasing mode, determine the erasing distance of the fixed-block erasing mode as a half of the shortest side length of the preset fixed erasing block; or
In response to the selected erasing mode being the circular erasing mode, process a circular erasing path into a closed path, and determine the erasing distance of the circular erasing mode as the shortest distance between a data point on the closed path, and a central point of the closed path.

10. The device according to claim 9, wherein the processor is further configured to execute the at least one machine readable program code to:
In response to the selected erasing mode comprising both of the fixed-block erasing mode and the circular erasing mode, determine a shorter one of erasing distances of the fixed-block erasing mode and the circular erasing mode as the erasing distance corresponding to the selected erasing mode.

11. A system for writing on an infrared electronic white board, the system comprising an infrared electronic white board, and a device for erasing a writing path on an infrared electronic white board, wherein:
the infrared electronic white board is configured to accept a writing operation of a user; and
the device comprises a memory configured to store at least one machine readable program code and a processor configured to execute the at least one machine readable program code to:
determine an erasing distance corresponding to a selected erasing mode, wherein the selected erasing mode comprises a fixed-block erasing mode or a circular erasing mode;
for any two adjacent data points on a writing path, determine whether a distance between the two adjacent data points on the writing path is more than the erasing distance, and in response to the distance between the two adjacent data points on the writing path being more than the erasing distance, add at least one data point between the two adjacent data points on the writing path, such that a distance between any two adjacent data points on the writing path is no more than the erasing distance;
determine an erasing area according to an input erasing path and the selected erasing mode, wherein in response to the selected erasing mode being the fixed-block erasing mode, determine each of a plurality of data points on the input erasing path as a center of a preset fixed erasing block to determine an erasing block, and determine a union set of erasing blocks corresponding to the data points on the input erasing path as the erasing area, or wherein in response to the selected erasing mode being the circular erasing mode, process a curve corresponding to the input erasing path into a closed path, and determine an area surrounded by the closed path as the erasing area; and
erase those data points on the writing path, which lie in the erasing area.

12. The system according to claim 11, wherein the processor is further configured to execute the at least one machine readable program code to:
for any two adjacent data points on the input erasing path, determine whether a distance between the two adjacent data points on the input erasing path is more than the erasing distance corresponding to the selected erasing mode; and
in response to the distance between the two adjacent data points on the input erasing path being more than the erasing distance corresponding to the selected erasing mode, add at least one data point between the two adjacent data points on the input erasing path, so that a distance between any two adjacent data points on the input erasing path is no more than the erasing distance corresponding to the selected erasing mode.

13. The system according to claim 11, wherein the processor is configured to execute the at least one machine readable program code to:
determine an intersection area of the writing path with the erasing area; and
determine those data points on the writing path, which lie in the intersection area, and erase the data points in the intersection area from the writing path.

14. The system according to claim 11, wherein the processor is configured to execute the at least one machine readable program code to:
in response to the selected erasing mode being the fixed-block erasing mode, determine the erasing distance of the fixed-block erasing mode as a half of the shortest side length of the preset fixed erasing block; or
in response to the selected erasing mode being the circular erasing mode, process a circular erasing path into a closed path, and determine the erasing distance of the circular erasing mode as the shortest distance between a data point on the closed path, and a central point of the closed path.

* * * * *